United States Patent
Mori et al.

[19]

[11] Patent Number: 6,116,017
[45] Date of Patent: Sep. 12, 2000

[54] COMBINED CYCLE POWER PLANT WITH STEAM COOLED GAS TURBINE

[75] Inventors: Hidetaka Mori; Hideaki Sugishita; Kazuharu Hirokawa; Yasushi Fukuizumi, all of Takasago, Japan

[73] Assignee: Mitsubishi Heavy Industries, Ltd., Tokyo, Japan

[21] Appl. No.: 09/031,888

[22] Filed: Feb. 27, 1998

[51] Int. Cl.[7] .................................. F02C 6/18; F02C 7/16
[52] U.S. Cl. ........................................ 60/39.182; 60/39.75
[58] Field of Search .............................. 60/39.182, 39.75, 60/730

[56] References Cited

U.S. PATENT DOCUMENTS 4,424,668   1/1984   Mukherjee ........................... 60/39.182

FOREIGN PATENT DOCUMENTS 74210   1/1995   Japan .

OTHER PUBLICATIONS

Patent Abstracts of Japan; Abstract for JP 06323162, Nov. 22, 1994.

*Primary Examiner*—Louis J. Casaregola

[57] ABSTRACT

In a combined cycle power plant, exhaust from a high pressure turbine is branched so that part of it is supplied to a steam cooling system, and the other part of it is supplied to an inlet of a reheater of an exhaust heat recovery boiler. The exhaust supplied to the steam cooling system performs predetermined cooling and becomes heated. Then, the heated exhaust is guided from an outlet of the steam cooling system to an intermediate position of the reheater, merged with the exhaust supplied to the inlet of the reheater, and temperature-adjusted in the reheater. Then, the reheated, combined steam is supplied to a downstream turbine for heat recovery. Thus, a safe, reliable steam cooling system is achieved by effectively using a sufficient amount of high pressure turbine exhaust.

2 Claims, 3 Drawing Sheets

COMBINED CYCLE POWER PLANT WITH STEAM COOLED GAS TURBINE

BACKGROUND OF THE INVENTION

This invention relates to a combined cycle power plant comprising a combination of a gas turbine plant and a steam turbine plant.

A combined cycle power plant is a power generation system comprising a combination of a gas turbine plant and a steam turbine plant. It performs the required work shared between a gas turbine for a high temperature range of thermal energy and a steam turbine for its low temperature range. Because of this configuration, this system effectively recovers and utilizes thermal energy. This power generation system has attracted marked attention in recent years.

On the combined cycle power plant, research and development have been performed with one of the crucial considerations for efficiency improvement being how far the high temperature range can be raised.

To form a high temperature range, a cooling system has to be installed from the aspect of heat resistance of a turbine structure. Air has been used as a coolant for the cooling system.

As long as air is used as a coolant, some disadvantages are encountered even if a high temperature range could be achieved. That is, a power loss is caused for pressurizing air, required for cooling, to a necessary pressure by means of an air compressor component of the system. In addition, the air that was used for cooling of the parts is finally introduced into a turbine channel through which a hot gas passes. As a result, the average gas temperature is lowered to decrease the energy of the gas. In view of these disadvantages, a further improvement in thermal efficiency cannot be expected in such a configuration.

In an attempt to solve these problems and achieve a further efficiency improvement, a system has appeared which adopts steam as a substitute for air as a coolant for the gas turbine. For instance, Japanese Unexamined Patent Publication No. 4210/95 has proposed such a system.

FIG. 3 shows the essential part of the system disclosed in Japanese Unexamined Patent Publication No. 4210/95, which has the following constitution:

A combined cycle power plant comprises a gas turbine plant 5 mainly composed of a gas turbine 1, an air compressor 2 and a combustor 3; an exhaust heat recovery boiler 10 using an exhaust gas from the gas turbine plant 5 as a heating source and mainly composed of a high pressure steam generator area 11, an intermediate pressure steam generator area 12, a low pressure steam generator area 13, and a reheater 14; and a steam turbine plant 20 supplied with steam from the exhaust heat recovery boiler 10 and mainly composed of a high pressure turbine 21, an intermediate pressure turbine 22, and a low pressure turbine 23.

A cooling system incorporated in this combined cycle power plant is a steam cooling system. According to this system, bleed steam extracted halfway in the stages of the high pressure turbine 21 is used as cooling steam. This steam is guided through a steam supply path 24 to a steam cooling system component 30 provided in a high temperature cooled area of the gas turbine 1 to cool this high temperature cooled area.

The cooling steam that cools the high temperature cooled area of the gas turbine 1 in this manner is itself heated by this cooling. That is, the steam receives thermal energy from the high temperature cooled area of the gas turbine 1. Then, the heated steam is further heated during passage through the reheater 14, and fed to the intermediate pressure turbine 22 of the steam turbine plant 20, where its accumulated thermal energy is recovered.

The numeral 25 denotes a condenser. Condensate obtained there is sent by a pressure pump 26 to the exhaust heat recovery boiler 10 via a feed water pipe 27. Part of the condensate is branched, and mixed into the aforementioned bled gas, which is cooling steam, from the high pressure turbine through a water spray pipe 29 by a feed water pump 28 to bring the cooling gas to a low temperature.

The numeral 6 denotes a generator, which is driven by the aforementioned gas turbine plant 5 and steam turbine plant 20.

In the conventional power plant constituted as described above, bleed steam extracted halfway in the stages of the high pressure turbine 21 is used as cooling steam which is guided to the steam cooling system component 30 provided in the high temperature cooled area of the gas turbine 1 to cool this high temperature cooled area. The amount of this bleed steam is not necessarily sufficient for use as cooling steam.

Unless the pressure loss of cooling steam in the high temperature cooled area, including the steam cooling system component 30, is made sufficiently small, therefore, a cooling system cannot be realized.

If the flow rate of the cooling steam is insufficient, moreover, the temperature of the steam in the high temperature cooled area becomes high. Thus, a spray or the like is needed to agree this high temperature with the temperature of a downstream part, for example, the inlet temperature of the intermediate pressure turbine. This leads to a decrease in the efficiency of the plant.

The path of the cooling steam constitutes an in-line channel. Should a leak of the cooling steam occur on the upstream side, therefore, the blade on the downstream side may fail to be supplied with cooling steam, and may be damaged.

SUMMARY OF THE INVENTION

The present invention is aimed at solving these problems with earlier technologies. Its object is to provide a power plant which effectively uses exhaust from a high pressure turbine to improve the overall efficiency markedly.

The present invention for attaining this object provides a combined cycle power plant which comprises a combination of a gas turbine plant and a steam turbine plant, includes an exhaust heat recovery boiler for generating steam turbine driving steam by utilizing exhaust heat from a gas turbine, and a steam cooling system for cooling a high temperature cooled area of the gas turbine with steam, and causes overheated steam from the steam cooling system to be recovered by a steam turbine; wherein the steam turbine plant is composed at least of a high pressure turbine and a low pressure turbine; and there are provided a line for guiding exhaust from the high pressure turbine to the steam cooling system, a line for guiding exhaust from the high pressure turbine to an inlet of a reheater of the exhaust heat recovery boiler, and a line for guiding outlet steam from the steam cooling system to an intermediate position of the reheater. As noted from this, exhaust from the high pressure turbine is branched so that part of it is supplied to the steam cooling system, and the other part of it is supplied to the inlet of the reheater of the exhaust heat recovery boiler. The exhaust supplied to the steam cooling system performs predetermined cooling and becomes heated. Then, the heated exhaust is guided from the outlet of the steam cooling system to the intermediate position of the reheater, merged with the exhaust supplied to the inlet of the reheater, and temperature-adjusted in the reheater. Then, the reheated, combined steam is supplied to a downstream turbine so that its heat is recovered.

The present invention also provides a combined cycle power plant which comprises a combination of a gas turbine plant and a steam turbine plant, includes an exhaust heat recovery boiler for generating steam turbine driving steam by utilizing exhaust heat from a gas turbine, and a steam cooling system for cooling a high temperature cooled area of the gas turbine with steam, and causes overheated steam from the steam cooling system to be recovered by a steam turbine; wherein the steam turbine plant is composed at least of a high pressure turbine and a low pressure turbine; and there are provided a line for guiding exhaust from the high pressure turbine to the steam cooling system, a line for guiding exhaust from the high pressure turbine to an inlet of a reheater of the exhaust heat recovery boiler, a line for guiding exhaust from the high pressure turbine to an inlet of a downstream turbine, and a line for guiding outlet steam from the steam cooling system to an intermediate position of the reheater. As noted from this, exhaust from the high pressure turbine is branched so that portions of it are supplied to the steam cooling system, the inlet of the reheater of the exhaust heat recovery boiler, and the inlet of the downstream turbine, respectively. The exhaust supplied to the steam cooling system performs predetermined cooling and becomes heated. Then, the heated exhaust is guided from the outlet of the steam cooling system to the intermediate position of the reheater, merged with the exhaust supplied to the inlet of the reheater, and temperature-adjusted in the reheater. Then, the reheated, combined steam is further merged with the exhaust directly fed the inlet of the downstream turbine, whereafter the resulting combined steam is supplied to a downstream turbine for recovery of its heat.

The present invention also provides the above-mentioned combined cycle power plant in which the high temperature cooled area of the gas turbine has a plurality of steam passages arranged in parallel. That portion of the exhaust from the high pressure turbine which was branched and supplied to the steam cooling system is fed to the parallel steam passages in the high temperature cooled area. This obviates the need to adjust the cooling steam supply temperature at the inlet of a succeeding cooled area under the influence of a temperature rise occurring in a preceding cooled area in a plurality of consecutive cooled areas as in an in-line passage. The above-described constitution of the invention also eliminates the concern that a steam leak, if any, on the upstream side as in the in-line passage may cut off the supply of cooling steam to the downstream side. Thus, the invention enhances the safety of the plant without impairing its efficiency.

DETAILED DESCRIPTION OF THE PREFERRED EMBODIMENTS

Figure 1:
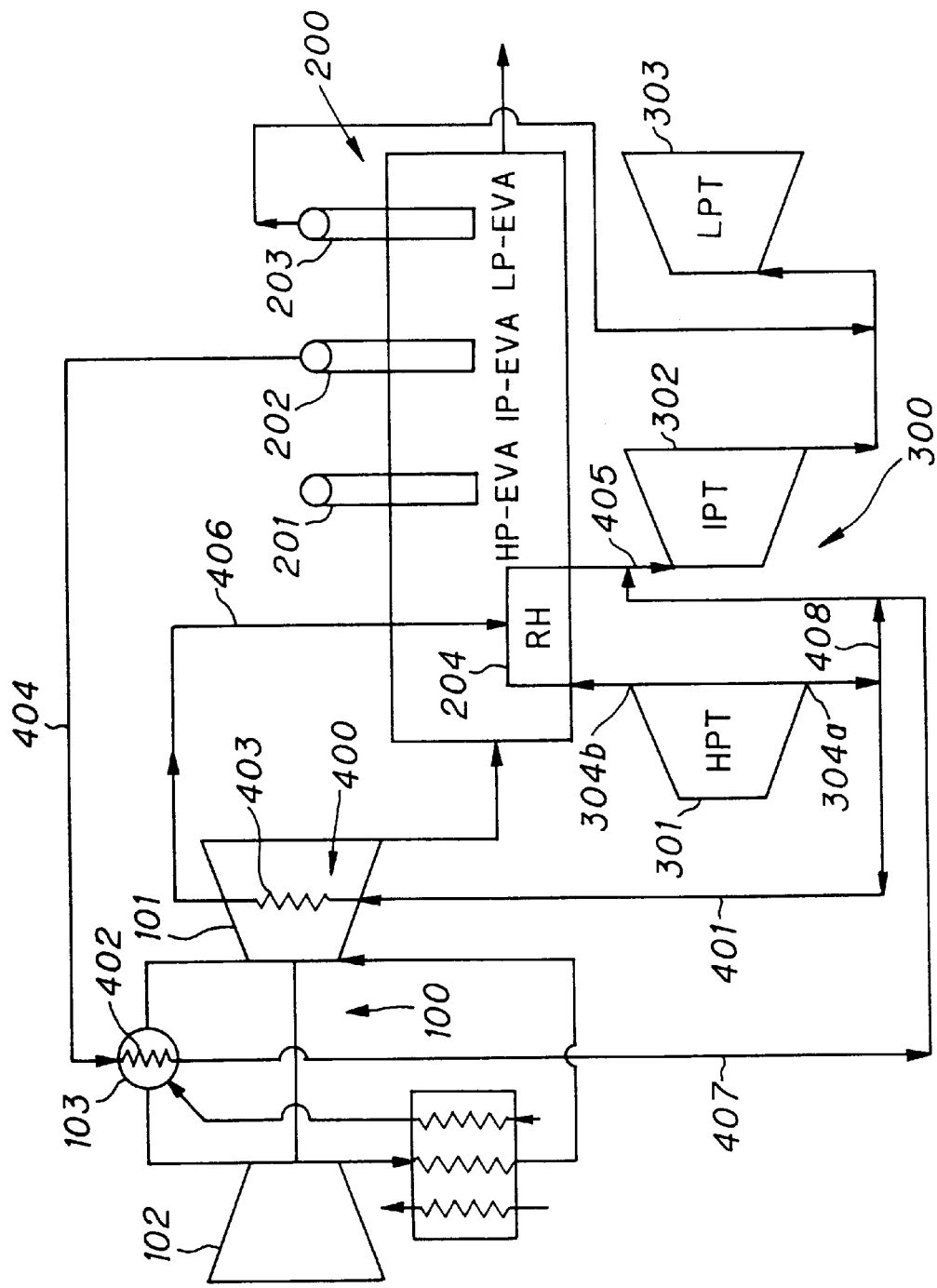
FIG. 1 is a system diagram of a combined cycle power plant concerned with an embodiment of the present invention.

An embodiment of the present invention will now be described with reference to FIGS. 1 and 2.

The numeral 100 denotes a gas turbine plant composed mainly of a gas turbine 101, an air compressor 102 driven by the gas turbine 101, and a combustor 103 for combusting compressed air, supplied from the air compressor 102, together with fuel.

The numeral 200 denotes an exhaust heat recovery boiler using an exhaust gas from the gas turbine 101 as a heating source and mainly composed of a high pressure steam generator area 201, an intermediate pressure steam generator area 202, a low pressure steam generator area 203, and a reheater 204.

The numeral 300 denotes a steam turbine plant mainly composed of a high pressure turbine 301 supplied with high pressure steam from the exhaust heat recovery boiler 200 (a supply system is not shown), an intermediate pressure turbine 302 supplied with steam from a steam supply system 405, and a low pressure turbine 303 supplied with low pressure steam from the exhaust heat recovery boiler 200, etc.

The numeral 400 denotes a steam cooling system mainly composed of a steam cooling system component 403 connected to an exhaust portion 304a of the high pressure turbine 301 by a high pressure exhaust pipe 401, for cooling a high temperature cooled area of the gas turbine 101; and a steam cooling system component 402 connected to the intermediate pressure steam generator area 202 by an intermediate pressure steam supply system 404, for cooling a high temperature cooled area of the combustor 103.

The steam cooling system component 403 for cooling the high temperature cooled area of the gas turbine 101 is connected to the reheater 204 so that its outlet steam is guided to an intermediate position of the reheater 204 by a line 406. Outlet steam from the steam cooling system component 402 for cooling the high temperature cooled area of the combustor 103 passes through a line 407, and joins a steam supply system 405 to be guided to an inlet of the intermediate pressure turbine 302.

The high pressure turbine 301 has an exhaust portion 304b in a manner symmetrical to, or branched from, the exhaust portion 304a (here, it is depicted symmetrically). High pressure exhaust from the high pressure turbine 301 communicates with the inlet of the reheater 204 via the exhaust portion 304b.

Another part of high pressure exhaust from the high pressure turbine 301 flows through a line 408 branched from the high pressure exhaust pipe 401 by the exhaust portion 304b. Then, it merges into the steam supply system 405, and communicates with the inlet of the intermediate pressure turbine 302.

According to the instant embodiment, the high pressure exhaust from the high pressure turbine 301 is used as cooling steam, and the outlet steam from the steam cooling system component 403 of the gas turbine 101 is guided to the intermediate position of the reheater 204 by the line 406. With the steam cooling system component 403, therefore, there is no need to raise the steam temperature after cooling to the inlet temperature of the intermediate pressure turbine 302 located at a downstream position.

As noted above, the temperature rise of steam by cooling can be kept small. This means that the heating surface area in the steam cooling portion can be made small, which in turn means that the pressure loss can be decreased.

In other words, when the steam temperature after cooling is to be brought to a predetermined value in a steam cooling system, the heat transfer coefficient of a cooling steam channel and the heating surface area of the cooling steam channel must be increased, if the flow rate of cooling steam is low. By so doing, the temperature rise of the cooling steam must be made great, whereby the pressure loss becomes large. As stated above, however, if the temperature increase can be assigned to a reheater, and the steam cooling system need not raise the temperature to a predetermined level, then it becomes unnecessary to make the heat transfer coefficient and the heating surface area of the cooling steam channel large. Thus, the pressure loss per blade can be kept small.

Consequently, it becomes easy to configure the channels of cooling steam in the steam cooling system component 403 in a parallel arrangement as will be described later on. This improves safety in case of a steam leak.

Since cooling steam flows through parallel channels in this manner, the temperature rise can be set to be small, and spraying water halfway is not necessary. Hence, disadvantages such as an efficiency decrease and losses due to spraying are eliminated.

The steam cooling system component 403 that cools the high temperature cooled area of the gas turbine 101 in the instant embodiment is merely shown schematically in FIG. 1. In detail, this system component constitutes the flow of cooling steam through parallel channels. This is described in FIG. 2.

Figure 2:
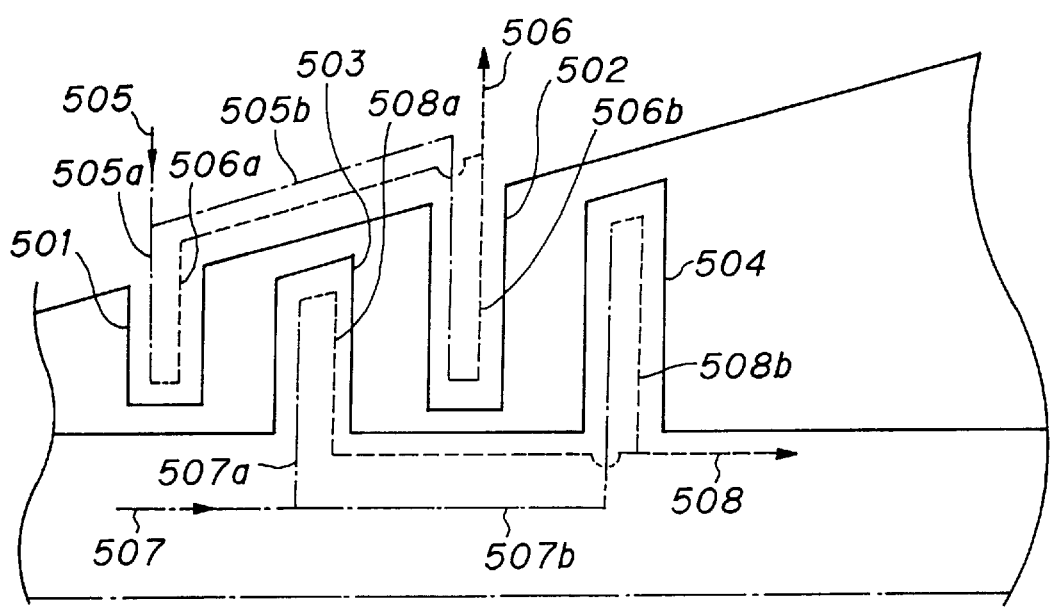
FIG. 2 is a schematic view showing the outline of the essential part of a cooled area of a gas turbine in FIG. 1.
Figure 3:
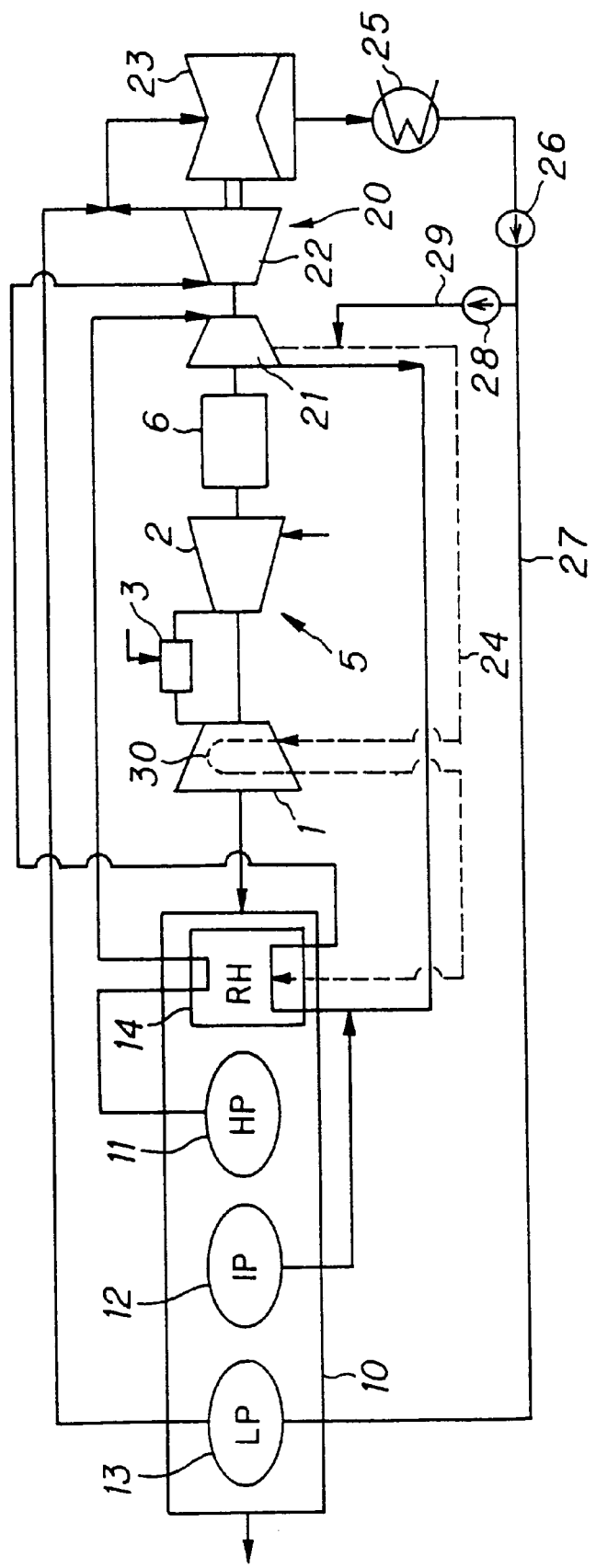
FIG. 3 is a system diagram of a conventional combined cycle power plant.

In FIG. 2, the numeral 501 denotes a first-stage stationary blade, 502 a second-stage stationary blade, 503 a first-stage moving blade, and 504 a second-stage moving blade. The numeral 505 denotes a supply path for cooling steam, which is branched halfway to communicate with a cooling steam passage 505a of the first-stage stationary blade and a cooling steam passage 505b of the second-stage stationary blade.

The cooling steam passages 505a, 505b communicate, respectively, with a recovery passage 506a of the first-stage stationary blade 501 and a recovery passage 506b of the second-stage stationary blade 502 past the cooled areas of the first- and second-stage stationary blades. The recovery passages 506a, 506b merge, downstream, into a steam recovery passage 506.

That is, the cooling steam passages 505a, 505b and the recovery passages 506a, 506b communicating therewith constitute parallel passages independent of each other at the positions of the first- and second-stage stationary blades 501, 502.

On the moving blade side, as contrasted with the stationary blade side, the numeral 507 denotes a supply path for cooling steam. The supply path is branched halfway to communicate with a cooling steam passage 507a of the first-stage moving blade and a cooling steam passage 507b of the second-stage moving blade.

The cooling steam passages 507a, 507b communicate, respectively, with a recovery passage 508a of the first-stage moving blade 503 and a recovery passage 508b of the second-stage moving blade 504 past the cooled areas of the first- and second-stage moving blades. The recovery passages 508a, 508b merge, downstream, into a steam recovery passage 508.

That is, similar to the stationary blade side, the cooling steam passages 507a, 507b and the recovery passages 508a, 508b communicating therewith constitute parallel passages independent of each other at the positions of the first- and second-stage moving blades 503, 504.

In this parallel channel, the stationary blade side will be considered first. Cooling steam fed by an external cooling steam source (not shown) is introduced from the supply path 505, branched into the cooling steam passages 505a, 505b, and directly introduced into the first-stage stationary blade 501 and the second-stage stationary blade 502. The introduced steam cools the high temperature cooled areas of the first-stage stationary blade 501 and the second-stage stationary blade 502, whereby it is heated itself. Then, the heated steam is merged into the steam recovery passage 506 through the independent recovery passages 506a, 506b, and passed through the reheater (not shown) disposed downstream. Then, its heat is recovered by a steam turbine or the like.

In this case, the cooling steam flowing through the cooling steam passage 505a is unrelated to the cooling steam passage 505b. Also, the cooling steam flowing through the cooling steam passage 505b is unrelated to the cooling steam passage 505a. Thus, even if a cooling steam leak happened on one side, it would not directly affect the other side, so that an accident such as damage to the blade could be prevented.

As for the moving blade side, disadvantages such as damage to the blade can be prevented, and heat recovery by a steam turbine or the like (not shown) through the steam recovery passage 508 takes place, in exactly the same manner as for the stationary blade side. This will be easily understood without an overlapping explanation.

According to the first aspect of the present invention, as described above, a sufficient amount of high pressure turbine exhaust is used as a coolant for the high pressure cooled area of the gas turbine. Thus, safe, reliable cooling can be performed without lack of the coolant. Also, outlet steam leaving the cooled area is passed through the intermediate position of the reheater for temperature adjustment, and recovered by the downstream steam turbine. Hence, its high temperature at the cooled area is prevented to suppress a pressure loss associated with a temperature rise, and the output of the downstream steam turbine is increased to improve the gross thermal efficiency.

According to the second aspect of the invention, exhaust from the high pressure turbine is used for supply to the high temperature cooled area, supply to the reheater of the exhaust heat recovery boiler, and direct supply to the inlet of the downstream turbine. Furthermore, the exhaust supplied to the exhaust heat recovery boiler merges with the exhaust from the high temperature cooled area halfway in the reheater. The combined steam does work in the downstream turbine. By making adjustment in the lines for these supplies, therefore, the action of the downstream turbine can be easily made desirable to enhance the efficiency improvement of the downstream turbine further.

According to the third aspect of the invention, the steam passage of the high temperature cooled area of the gas turbine is formed from the plurality of parallel passages. Thus, the respective passages function independently, and a steam leak in one of them does not directly affect steam supply in the other. Hence, a highly safe, highly efficient power plant can be achieved.

While the present invention has been described with reference to the illustrated embodiment, it is to be understood that the invention is not restricted thereby, but various changes and modifications may be made in the concrete structure of the invention without departing from the spirit and scope of the invention.

What is claimed is:

1. In a combined cycle power plant which comprises a combination of a gas turbine plant and a steam turbine plant, includes an exhaust heat recovery boiler for generating steam turbine driving steam by utilizing exhaust heat from a gas turbine, and a steam cooling system for cooling a high temperature cooled area of the gas turbine with steam, and causes overheated steam from the steam cooling system to be recovered by a steam turbine, the steam turbine plant including at least a high pressure turbine and a low pressure turbine, the improvement comprising:

a first conduit for guiding exhaust from the high pressure turbine to the steam cooling system, a second conduit for guiding exhaust from the high pressure turbine to an inlet of a reheater of the exhaust heat recovery boiler, a third conduit for guiding exhaust from the high pressure turbine to an inlet of a downstream turbine, and a fourth conduit for guiding outlet steam from the steam cooling system to an intermediate position of the reheater.

2. A combined cycle power plant as claimed in claim 1, wherein a high temperature cooled area of the gas turbine has a plurality of steam passages arranged in parallel.

* * * * *

UNITED STATES PATENT AND TRADEMARK OFFICE
CERTIFICATE OF CORRECTION

PATENT NO. : 6,116,017
DATED : September 12, 2000
INVENTOR(S) : H. Mori et al.

It is certified that error appears in the above-identified patent and that said Letters Patent is hereby corrected as shown below:

<u>Title page,</u>
Under item [56] References Cited:
Please insert the following under the heading "FOREIGN PATENT DOCUMENTS":

0736669A2    10/1996    European
    0743425A1    11/1996    European
    0062932A1    10/1982    European
    2298243A    08/1996    Great Britain Please insert the following under the heading "OTHER PUBLICATIONS":
Patent Abstracts of Japan; Abstract for JP 09189236A, July 22, 1997

Signed and Sealed this

Eighteenth Day of September, 2001

*Attest:*

NICHOLAS P. GODICI
*Attesting Officer*     *Acting Director of the United States Patent and Trademark Office*